US011271895B1

(12) United States Patent
Vallala et al.

(10) Patent No.: US 11,271,895 B1
(45) Date of Patent: Mar. 8, 2022

(54) IMPLEMENTING ADVANCED NETWORKING CAPABILITIES USING HELM CHARTS

(71) Applicant: Robin Systems, Inc., San Jose, CA (US)

(72) Inventors: Shravan Kumar Vallala, San Jose, CA (US); Rohan Parulekar, Sunnyvale, CA (US); Tushar Doshi, Santa Clara, CA (US); Hariharan Sethuraman, Bengaluru (IN)

(73) Assignee: ROBIN SYSTEMS, INC., San Jose, CA (US)

( * ) Notice: Subject to any disclaimer, the term of this patent is extended or adjusted under 35 U.S.C. 154(b) by 0 days.

(21) Appl. No.: 17/065,317

(22) Filed: Oct. 7, 2020

(51) Int. Cl.
*H04L 29/12* (2006.01)
*H04L 12/24* (2006.01)
*G06F 8/61* (2018.01)
*H04L 61/5007* (2022.01)
*H04L 41/0803* (2022.01)

(52) U.S. Cl.
CPC ............ *H04L 61/2007* (2013.01); *G06F 8/61* (2013.01); *H04L 41/0803* (2013.01)

(58) Field of Classification Search
CPC .... H04L 61/2007; H04L 41/0803; G06F 8/61
See application file for complete search history.

(56) References Cited

U.S. PATENT DOCUMENTS

| 3,715,573 A | 2/1973 | Vogelsberg |
| 4,310,883 A | 1/1982 | Clifton |
| 5,602,993 A | 2/1997 | Stromberg |
| 5,680,513 A | 10/1997 | Hyland |
| 5,796,290 A | 8/1998 | Takahashi |

(Continued)

FOREIGN PATENT DOCUMENTS

WO  WO2017008675  1/2017

OTHER PUBLICATIONS

The Linux Foundation, Pod Lifecycle, Sep. 22, 2019, https://web.archive.org/web/20190922200425/https://kubernetes.io/docs/concepts/workloads/pods/pod-lifecycle/ (Year: 2019).*

(Continued)

*Primary Examiner* — Wing F Chan
*Assistant Examiner* — Billy H Ng
(74) *Attorney, Agent, or Firm* — David R. Stevens; Stevens Law Group (57) ABSTRACT

A KUBERNETES installation processes a script and invokes a scheduling agent in response to encountering an instruction to create a pod. The scheduling agent is an agent of an orchestrator and performs tasks such as identifying a selected node, creating multiple interface objects with multiple IP addresses, and creating storage volumes in coordination with the orchestrator. Upon creation, the pod may call a CNI that is an agent of the orchestrator in order to configure the pod to use the multiple interface objects. The pod may call a CSI that is an agent of the orchestrator in order to bind a storage volume to the pod. The scheduling agent may coordinate with the orchestrator to implement affinity and anti-affinity rules for placement of pods and storage volumes. The script may also be transformed by the orchestrator in order to insert instructions implementing affinity and ant-affinity rules.

20 Claims, 9 Drawing Sheets

(56) References Cited

U.S. PATENT DOCUMENTS

| | | |
|---|---|---|
| 6,014,669 A | 1/2000 | Slaughter |
| 6,052,797 A | 4/2000 | Ofek |
| 6,119,214 A | 9/2000 | Dirks |
| 6,157,963 A | 12/2000 | Courtright, II |
| 6,161,191 A | 12/2000 | Slaughter |
| 6,298,478 B1 | 10/2001 | Nally |
| 6,301,707 B1 | 10/2001 | Carroll |
| 6,311,193 B1 | 10/2001 | Sekido |
| 6,851,034 B2 | 2/2005 | Challenger |
| 6,886,160 B1 | 4/2005 | Lee |
| 6,895,485 B1 | 5/2005 | Dekoning |
| 6,957,221 B1 | 10/2005 | Hart |
| 7,096,465 B1 | 8/2006 | Dardinski |
| 7,111,055 B2 | 9/2006 | Falkner |
| 7,171,659 B2 | 1/2007 | Becker |
| 7,246,351 B2 | 7/2007 | Bloch |
| 7,305,671 B2 | 12/2007 | Davidov |
| 7,461,374 B1 | 12/2008 | Balint |
| 7,467,268 B2 | 12/2008 | Lindemann |
| 7,535,854 B2 | 5/2009 | Luo |
| 7,590,620 B1 | 9/2009 | Pike |
| 7,698,698 B2 | 4/2010 | Skan |
| 7,721,283 B2 | 5/2010 | Kovachka |
| 7,734,859 B2 | 6/2010 | Daniel |
| 7,738,457 B2 | 6/2010 | Nordmark |
| 7,779,091 B2 | 8/2010 | Wilkinson |
| 7,797,693 B1 | 9/2010 | Gustafson |
| 7,984,485 B1 | 7/2011 | Rao |
| 8,037,471 B2 | 10/2011 | Keller |
| 8,046,450 B1 | 10/2011 | Schloss |
| 8,060,522 B2 | 11/2011 | Birdwell |
| 8,121,874 B1 | 2/2012 | Guheen |
| 8,171,141 B1 | 5/2012 | Offer |
| 8,219,821 B2 | 7/2012 | Zimmels |
| 8,250,033 B1 | 8/2012 | De Souter |
| 8,261,295 B1 | 9/2012 | Risbood |
| 8,326,883 B2 | 12/2012 | Pizzorni |
| 8,392,498 B2 | 3/2013 | Berg |
| 8,429,346 B1 | 4/2013 | Chen |
| 8,464,241 B2 | 6/2013 | Hayton |
| 8,505,003 B2 | 8/2013 | Bowen |
| 8,527,544 B1 | 9/2013 | Colgrove |
| 8,589,447 B1 | 11/2013 | Grunwald et al. |
| 8,601,467 B2 | 12/2013 | Hofhansl |
| 8,620,973 B1 | 12/2013 | Veeraswamy |
| 8,666,933 B2 | 3/2014 | Pizzorni |
| 8,745,003 B1 | 6/2014 | Patterson |
| 8,775,751 B1 | 7/2014 | Pendharkar |
| 8,782,632 B1 | 7/2014 | Chigurapati |
| 8,788,634 B2 | 7/2014 | Krig |
| 8,832,324 B1 | 9/2014 | Hodges |
| 8,886,806 B2 | 11/2014 | Tung |
| 8,909,885 B2 | 12/2014 | Corbett |
| 8,954,383 B1 | 2/2015 | Vempati |
| 8,954,568 B2 | 2/2015 | Krishnan |
| 8,966,198 B1 | 2/2015 | Harris |
| 9,009,542 B1 | 4/2015 | Marr |
| 9,134,992 B2 | 9/2015 | Wong |
| 9,146,769 B1 | 9/2015 | Shankar |
| 9,148,465 B2 | 9/2015 | Gambardella |
| 9,152,337 B2 | 10/2015 | Kono |
| 9,167,028 B1 | 10/2015 | Bansal |
| 9,280,591 B1 | 3/2016 | Kharatishvili |
| 9,330,155 B1 | 5/2016 | Bono |
| 9,336,060 B2 | 5/2016 | Nori |
| 9,342,444 B2 | 5/2016 | Minckler |
| 9,367,301 B1 | 6/2016 | Serrano |
| 9,390,128 B1 | 7/2016 | Seetala |
| 9,436,693 B1 | 9/2016 | Lockhart |
| 9,514,160 B2 | 12/2016 | Song |
| 9,521,198 B1 | 12/2016 | Agarwala |
| 9,569,274 B2 | 2/2017 | Tarta |
| 9,569,480 B2 | 2/2017 | Provencher |
| 9,590,872 B1 | 3/2017 | Jagtap |
| 9,600,193 B2 | 3/2017 | Ahrens |
| 9,613,119 B1 | 4/2017 | Aron |
| 9,619,389 B1 | 4/2017 | Roug |
| 9,635,132 B1 | 4/2017 | Lin |
| 9,667,470 B2 | 5/2017 | Prathipati |
| 9,733,992 B1 | 8/2017 | Poeluev |
| 9,747,096 B2 | 8/2017 | Searlee |
| 9,870,366 B1 | 1/2018 | Duan |
| 9,880,933 B1 | 1/2018 | Gupta |
| 9,892,265 B1 | 2/2018 | Tripathy |
| 9,929,916 B1 | 3/2018 | Subramanian |
| 9,998,955 B1 | 6/2018 | Maccarthaigh |
| 10,019,459 B1 | 7/2018 | Agarwala |
| 10,042,628 B2 | 8/2018 | Thompson |
| 10,061,520 B1 | 8/2018 | Zhao |
| 10,133,619 B1 | 11/2018 | Nagpal |
| 10,169,169 B1 | 1/2019 | Shaikh |
| 10,191,778 B1 | 1/2019 | Yang |
| 10,241,774 B2 | 3/2019 | Spivak |
| 10,282,229 B2 | 5/2019 | Wagner |
| 10,339,112 B1 | 7/2019 | Ranade |
| 10,353,634 B1 | 7/2019 | Greenwood |
| 10,430,434 B2 | 10/2019 | Sun |
| 10,657,119 B1 | 5/2020 | Acheson |
| 10,956,246 B1 | 3/2021 | Bagde |
| 2002/0141390 A1 | 10/2002 | Fangman |
| 2004/0010716 A1 | 1/2004 | Childress |
| 2004/0153703 A1 | 8/2004 | Vigue |
| 2004/0221125 A1 | 11/2004 | Ananthanarayanan |
| 2005/0065986 A1 | 3/2005 | Bixby |
| 2005/0216895 A1 | 9/2005 | Tran |
| 2005/0256948 A1 | 11/2005 | Hu |
| 2006/0025908 A1 | 2/2006 | Rachlin |
| 2006/0053357 A1 | 3/2006 | Rajski |
| 2006/0085674 A1 | 4/2006 | Ananthamurthy |
| 2006/0259686 A1 | 11/2006 | Sonobe |
| 2007/0006015 A1 | 1/2007 | Rao |
| 2007/0016786 A1 | 1/2007 | Waltermann |
| 2007/0067583 A1 | 3/2007 | Zohar |
| 2007/0165625 A1 | 7/2007 | Eisner |
| 2007/0260842 A1 | 11/2007 | Faibish |
| 2007/0277056 A1 | 11/2007 | Varadarajan |
| 2007/0288791 A1 | 12/2007 | Allen |
| 2008/0010421 A1 | 1/2008 | Chen |
| 2008/0068899 A1 | 3/2008 | Ogihara |
| 2008/0189468 A1 | 8/2008 | Schmidt |
| 2008/0235544 A1 | 9/2008 | Lai |
| 2008/0256141 A1 | 10/2008 | Wayda |
| 2008/0256143 A1 | 10/2008 | Reddy |
| 2008/0256167 A1 | 10/2008 | Branson |
| 2008/0263400 A1 | 10/2008 | Waters |
| 2008/0270592 A1 | 10/2008 | Choudhary |
| 2009/0144497 A1 | 6/2009 | Withers |
| 2009/0172335 A1 | 7/2009 | Kulkarni |
| 2009/0240809 A1 | 9/2009 | La Frese |
| 2009/0254701 A1 | 10/2009 | Kurokawa |
| 2009/0307249 A1 | 12/2009 | Koifman |
| 2010/0100251 A1 | 4/2010 | Chao |
| 2010/0161941 A1 | 6/2010 | Vyshetsky |
| 2010/0162233 A1 | 6/2010 | Ku |
| 2010/0211815 A1 | 8/2010 | Mankovskii |
| 2010/0274984 A1 | 10/2010 | Inomata |
| 2010/0299309 A1 | 11/2010 | Maki |
| 2010/0306495 A1 | 12/2010 | Kumano |
| 2010/0332730 A1 | 12/2010 | Royer |
| 2011/0083126 A1 | 4/2011 | Bhakta |
| 2011/0119664 A1 | 5/2011 | Kimura |
| 2011/0161291 A1 | 6/2011 | Taleck |
| 2011/0188506 A1 | 8/2011 | Arribas |
| 2011/0208928 A1 | 8/2011 | Chandra |
| 2011/0239227 A1 | 9/2011 | Schaefer |
| 2011/0246420 A1 | 10/2011 | Wang |
| 2011/0276951 A1 | 11/2011 | Jain |
| 2012/0005557 A1 | 1/2012 | Mardiks |
| 2012/0016845 A1 | 1/2012 | Bates |
| 2012/0066449 A1 | 3/2012 | Colgrove |
| 2012/0102369 A1 | 4/2012 | Hiltunen |
| 2012/0137059 A1 | 5/2012 | Yang |
| 2012/0159519 A1 | 6/2012 | Matsuda |
| 2012/0216052 A1 | 8/2012 | Dunn |

(56) References Cited

U.S. PATENT DOCUMENTS

| | | |
|---|---|---|
| 2012/0226667 A1 | 9/2012 | Volvovski |
| 2012/0240012 A1 | 9/2012 | Weathers |
| 2012/0259819 A1 | 10/2012 | Patwardhan |
| 2012/0265976 A1 | 10/2012 | Spiers |
| 2012/0303348 A1 | 11/2012 | Lu |
| 2012/0311671 A1 | 12/2012 | Wood |
| 2012/0331113 A1 | 12/2012 | Jain |
| 2013/0054552 A1 | 2/2013 | Hawkins |
| 2013/0054932 A1 | 2/2013 | Acharya |
| 2013/0080723 A1 | 3/2013 | Sawa |
| 2013/0254521 A1 | 9/2013 | Bealkowski |
| 2013/0282662 A1 | 10/2013 | Kumarasamy |
| 2013/0332688 A1 | 12/2013 | Corbei |
| 2013/0339659 A1 | 12/2013 | Bybell |
| 2013/0346618 A1 | 12/2013 | Holkkola |
| 2013/0346709 A1 | 12/2013 | Wang |
| 2014/0006465 A1 | 1/2014 | Davis |
| 2014/0047263 A1 | 2/2014 | Coatney |
| 2014/0047341 A1 | 2/2014 | Breternitz |
| 2014/0047342 A1 | 2/2014 | Breternitz |
| 2014/0058871 A1 | 2/2014 | Marr |
| 2014/0059527 A1 | 2/2014 | Gagliardi |
| 2014/0059528 A1 | 2/2014 | Gagliardi |
| 2014/0089265 A1 | 3/2014 | Talagala |
| 2014/0108483 A1 | 4/2014 | Tarta |
| 2014/0130040 A1 | 5/2014 | Lemanski |
| 2014/0149696 A1 | 5/2014 | Frenkel |
| 2014/0181676 A1 | 6/2014 | Samborskyy |
| 2014/0195847 A1 | 7/2014 | Webman |
| 2014/0245319 A1 | 8/2014 | Fellows |
| 2014/0281449 A1 | 9/2014 | Christopher |
| 2014/0282596 A1 | 9/2014 | Bourbonnais |
| 2015/0046644 A1 | 2/2015 | Karp |
| 2015/0067031 A1 | 3/2015 | Acharya |
| 2015/0074358 A1 | 3/2015 | Flinsbaugh |
| 2015/0106549 A1 | 4/2015 | Brown |
| 2015/0112951 A1 | 4/2015 | Narayanamurthy |
| 2015/0134857 A1 | 5/2015 | Hahn |
| 2015/0149605 A1 | 5/2015 | De La Iglesia |
| 2015/0186217 A1 | 7/2015 | Eslami |
| 2015/0278333 A1 | 10/2015 | Hirose |
| 2015/0317212 A1 | 11/2015 | Lee |
| 2015/0319160 A1 | 11/2015 | Ferguson |
| 2015/0326481 A1 | 11/2015 | Rector |
| 2015/0379287 A1 | 12/2015 | Mathur |
| 2016/0011816 A1 | 1/2016 | Aizman |
| 2016/0026667 A1 | 1/2016 | Mukherjee |
| 2016/0042005 A1 | 2/2016 | Liu |
| 2016/0124775 A1 | 5/2016 | Ashtiani |
| 2016/0197995 A1 | 7/2016 | Lu |
| 2016/0239412 A1 | 8/2016 | Wada |
| 2016/0259597 A1 | 9/2016 | Worley |
| 2016/0283261 A1 | 9/2016 | Nakatsu |
| 2016/0357456 A1 | 12/2016 | Iwasaki |
| 2016/0357548 A1 | 12/2016 | Stanton |
| 2016/0373327 A1 | 12/2016 | Degioanni |
| 2017/0034023 A1 | 2/2017 | Nickolov |
| 2017/0060710 A1 | 3/2017 | Ramani |
| 2017/0060975 A1 | 3/2017 | Akyureklier |
| 2017/0075749 A1 | 3/2017 | Ambichl |
| 2017/0139645 A1 | 5/2017 | Byun |
| 2017/0149843 A1 | 5/2017 | Amulothu |
| 2017/0168903 A1 | 6/2017 | Dornemann |
| 2017/0192889 A1 | 7/2017 | Sato |
| 2017/0206017 A1 | 7/2017 | Sun |
| 2017/0214550 A1 | 7/2017 | Kumar |
| 2017/0235649 A1 | 8/2017 | Shah |
| 2017/0242617 A1 | 8/2017 | Walsh |
| 2017/0242719 A1 | 8/2017 | Tsirkin |
| 2017/0244557 A1 | 8/2017 | Riel |
| 2017/0244787 A1 | 8/2017 | Rangasamy |
| 2017/0293450 A1 | 10/2017 | Battaje |
| 2017/0322954 A1 | 11/2017 | Horowitz |
| 2017/0337492 A1 | 11/2017 | Chen |
| 2017/0371551 A1 | 12/2017 | Sachdev |
| 2018/0006896 A1 | 1/2018 | Macnamara |
| 2018/0024889 A1 | 1/2018 | Verma |
| 2018/0046553 A1 | 2/2018 | Okamoto |
| 2018/0082053 A1 | 3/2018 | Brown |
| 2018/0107419 A1 | 4/2018 | Sachdev |
| 2018/0113625 A1 | 4/2018 | Sancheti |
| 2018/0113770 A1 | 4/2018 | Hasanov |
| 2018/0136931 A1 | 5/2018 | Hendrich |
| 2018/0137306 A1 | 5/2018 | Brady |
| 2018/0150306 A1 | 5/2018 | Govindaraju |
| 2018/0159745 A1 | 6/2018 | Byers |
| 2018/0165170 A1 | 6/2018 | Hegdal |
| 2018/0218000 A1 | 8/2018 | Setty |
| 2018/0225140 A1 | 8/2018 | Titus |
| 2018/0225216 A1 | 8/2018 | Filippo |
| 2018/0246670 A1 | 8/2018 | Baptist |
| 2018/0246745 A1 | 8/2018 | Aronovich |
| 2018/0247064 A1 | 8/2018 | Aronovich |
| 2018/0276215 A1 | 9/2018 | Chiba |
| 2018/0285164 A1 | 10/2018 | Hu |
| 2018/0285223 A1 | 10/2018 | Mcbride |
| 2018/0285353 A1 | 10/2018 | Ramohalli |
| 2018/0287883 A1 | 10/2018 | Joshi |
| 2018/0288129 A1 | 10/2018 | Joshi |
| 2018/0302335 A1 | 10/2018 | Gao |
| 2018/0329981 A1 | 11/2018 | Gupte |
| 2018/0364917 A1 | 12/2018 | Ki |
| 2018/0365092 A1 | 12/2018 | Linetskiy |
| 2018/0375728 A1 | 12/2018 | Gangil |
| 2019/0004704 A1 | 1/2019 | Rathi |
| 2019/0065061 A1 | 2/2019 | Kim |
| 2019/0065323 A1 | 2/2019 | Dhamdhere |
| 2019/0073132 A1 | 3/2019 | Zhou |
| 2019/0073372 A1 | 3/2019 | Venkatesan |
| 2019/0079928 A1 | 3/2019 | Kumar |
| 2019/0089651 A1 | 3/2019 | Pignatari |
| 2019/0102226 A1 | 4/2019 | Caldato |
| 2019/0109756 A1 | 4/2019 | Abu Lebdeh |
| 2019/0116690 A1 | 4/2019 | Chen |
| 2019/0148932 A1 | 5/2019 | Benesch |
| 2019/0156023 A1 | 5/2019 | Gerebe |
| 2019/0163460 A1 | 5/2019 | Kludy |
| 2019/0188094 A1 | 6/2019 | Ramamoorthi |
| 2019/0190803 A1 | 6/2019 | Joshi |
| 2019/0199601 A1 | 6/2019 | Lynar |
| 2019/0213080 A1 | 7/2019 | Alluboyina |
| 2019/0213085 A1 | 7/2019 | Alluboyina |
| 2019/0215313 A1 | 7/2019 | Doshi |
| 2019/0220266 A1 | 7/2019 | Doshi |
| 2019/0220315 A1 | 7/2019 | Vallala |
| 2019/0235895 A1 | 8/2019 | Ovesea |
| 2019/0250849 A1 | 8/2019 | Compton |
| 2019/0272205 A1 | 9/2019 | Jiang |
| 2019/0278624 A1 | 9/2019 | Bade |
| 2019/0324666 A1 | 10/2019 | Kusters |
| 2019/0334727 A1 | 10/2019 | Kaufman |
| 2019/0361748 A1 | 11/2019 | Walters |
| 2019/0369273 A1 | 12/2019 | Liu |
| 2019/0370018 A1 | 12/2019 | Kirkpatrick |
| 2020/0019414 A1 | 1/2020 | Byard |
| 2020/0026635 A1 | 1/2020 | Gaber |
| 2020/0034193 A1 | 1/2020 | Jayaram |
| 2020/0034254 A1 | 1/2020 | Natanzon |
| 2020/0065406 A1 | 2/2020 | Lppatapu |
| 2020/0073586 A1 | 3/2020 | Kurata |
| 2020/0073692 A1* | 3/2020 | Rao ................ G06F 9/45558 |
| 2020/0083909 A1 | 3/2020 | Kusters |
| 2020/0150977 A1 | 5/2020 | Wang |
| 2020/0162330 A1 | 5/2020 | Vadapalli |
| 2020/0257519 A1 | 8/2020 | Shen |
| 2020/0310774 A1 | 10/2020 | Zhu |
| 2020/0310915 A1 | 10/2020 | Alluboyina |
| 2020/0356537 A1 | 11/2020 | Sun |
| 2020/0412625 A1 | 12/2020 | Bagarolo |
| 2021/0029000 A1 | 1/2021 | Mordani |
| 2021/0042151 A1 | 2/2021 | Muller |
| 2021/0064536 A1 | 3/2021 | Palmer |
| 2021/0067607 A1 | 3/2021 | Gardner |
| 2021/0126839 A1 | 4/2021 | Rudrachar |

(56) References Cited

U.S. PATENT DOCUMENTS

2021/0141655 A1 5/2021 Gamage
2021/0157622 A1 5/2021 Ananthapur
2021/0168034 A1 6/2021 Qian

OTHER PUBLICATIONS

Segment map, Google, Feb. 4, 2019.
Fast and Secure Append-Only storage with Infinite Capacity, Zheng, Aug. 27, 2003.
User Mode and Kernel Mode, Microsoft, Apr. 19, 2017.
Precise memory leak detection for java software using container profiling, Xu, Jul. 2013.
Mogi et al., "Dynamic Parity Stripe Reorganizations for RAID5 Disk Arrays," 1994, IEEE, pp. 17-26.
Syed et al., "The Container Manager Pattern", ACM, pp. 1-9 (Year 2017).
Rehmann et al., "Performance of Containerized Database Management Systems", ACM, pp. 1-6 (Year 2018).
Awada et al., "Improving Resource Efficiency of Container-instance Clusters on Clouds", IEEE, pp. 929-934 (Year 2017).
Stankovski et al., "Implementing Time-Critical Functionalities with a Distributed Adaptive Container Architecture", ACM, pp. 1-5 (Year 2016).
Dhakate et al., "Distributed Cloud Monitoring Using Docker as Next Generation Container Virtualization Technology" IEEE, pp. 1-5 (Year 2015).
Crameri et al., "Staged Deployment in Mirage, an Integrated Software Upgrade Testing and Distribution System", ACM, pp. 221-236 (Year: 2007).
Cosmo et al., "Packages Upgrades in FOSS Distributions: Details and Challenges", AC 2008).
Burg et al., "Atomic Upgrading of Distributed Systems", ACM, pp. 1-5 (Year: 2008).
Souer et al., "Component Based Architecture forWeb Content Management: Runtime Deployable Web Manager Component Bundles", IEEE, pp. 366-369 (Year: 2008).
Weingartner et al., "A distributed autonomic management framework for cloud computing orchestration." In 2016 IEEE World Congress on Services (Year: 2016).

* cited by examiner

IMPLEMENTING ADVANCED NETWORKING CAPABILITIES USING HELM CHARTS

RELATED APPLICATIONS

This application is related to U.S. application Ser. No. 17/065,345 filed Oct. 7, 2020, which is incorporated herein by reference for all purposes.

BACKGROUND

Field of the Invention

This invention relates to implementing containerized applications using an orchestration platform.

Background of the Invention

A multi-role application may include many objects providing different roles of the application. These objects may be application implementing services, storage volumes, databases, web servers, and the like. One environment that facilitates deployment of such applications is KUBERNETES, which was originally developed by GOOGLE.

It would be an advancement in the art to facilitate the deployment and management of multi-role applications, including those orchestrated using KUBERNETES.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
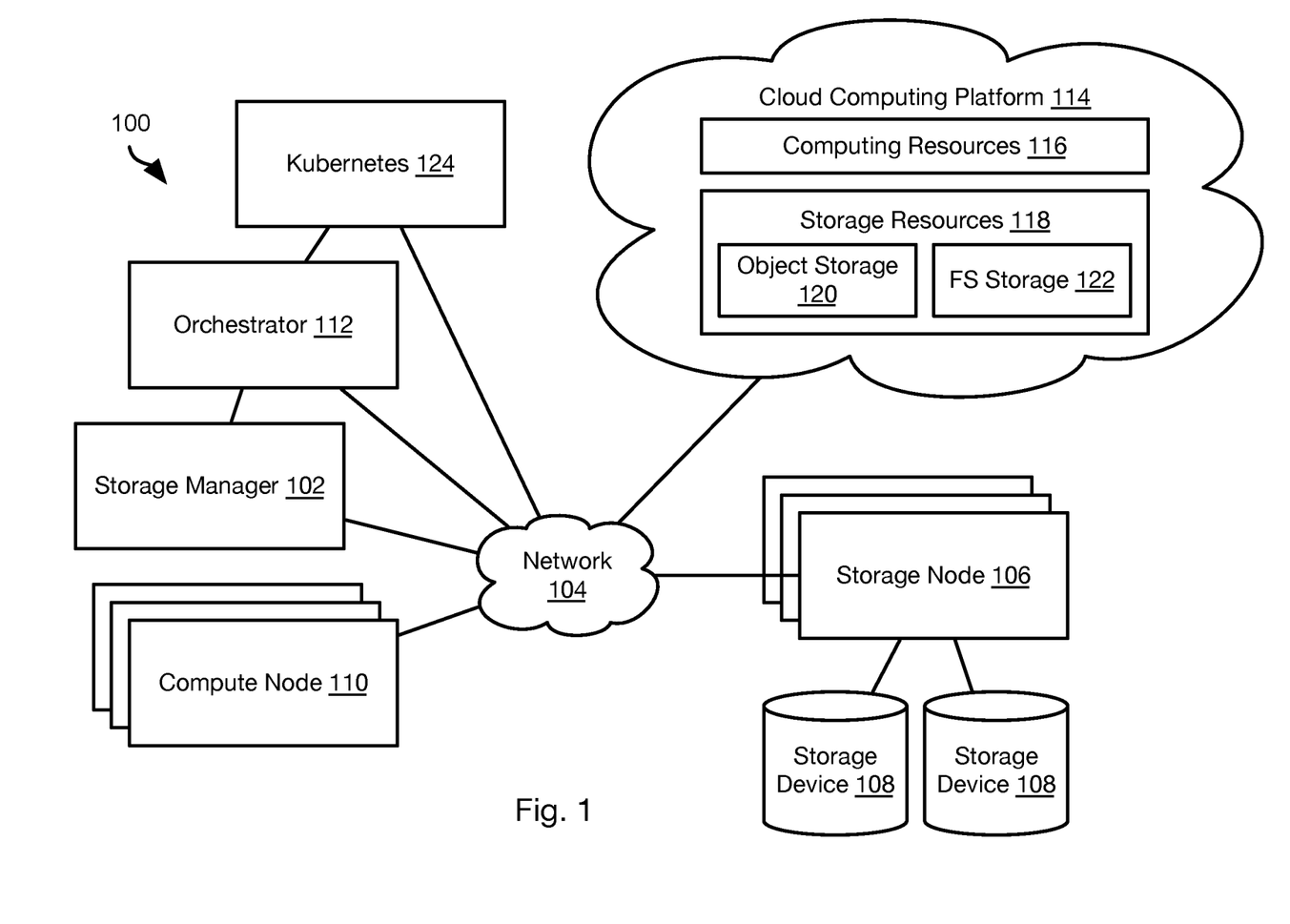
FIG. 1 is a schematic block diagram of a network environment for implementing methods in accordance with an embodiment of the present invention.

Referring to FIG. 1, the methods disclosed herein may be performed using the illustrated network environment 100. The network environment 100 includes a storage manager 102 that coordinates the creation of snapshots of storage volumes and maintains records of where snapshots are stored within the network environment 100. In particular, the storage manager 102 may be connected by way of a network 104 to one or more storage nodes 106, each storage node having one or more storage devices 108, e.g. hard disk drives, flash memory, or other persistent or transitory memory. The network 104 may be a local area network (LAN), wide area network (WAN), or any other type of network including wired, fireless, fiber optic, or any other type of network connections.

One or more compute nodes 110 are also coupled to the network 104 and host user applications that generate read and write requests with respect to storage volumes managed by the storage manager 102 and stored within the storage devices 108 of the storage nodes 108.

The methods disclosed herein ascribe certain functions to the storage manager 102, storage nodes 106, and compute node 110. The methods disclosed herein are particularly useful for large scale deployment including large amounts of data distributed over many storage nodes 106 and accessed by many compute nodes 110. However, the methods disclosed herein may also be implemented using a single computer implementing the functions ascribed herein to some or all of the storage manager 102, storage nodes 106, and compute node 110.

The creation of storage volumes on the storage nodes 106 and the instantiation of applications or applications executing within containers on the compute nodes 110 may be invoked by an orchestrator 112. The orchestrator may ingest a manifest defining a bundled application and invoke creation of storage volumes on storage nodes 106 and creation of containers and applications on the compute nodes according to the manifest.

In some embodiments, storage volumes and/or containers and applications may be instantiated on a cloud computing platform 114. In particular, the cloud computing platform 114 may be coupled to the network 104 and include cloud computing resources 116 and storage resources 118. The storage resources 118 may include various types of storage including object storage 120 in which data is stored as unstructured data and which is generally less expensive and has higher latency. The storage resources may include file system storage 122 that is implemented as a virtual disk in which data is stored in a structured format, such as within a hierarchical file system or a log-structured storage scheme.

The cloud computing platform 114 and corresponding resources 116, 118 may be implemented using any cloud computing platform known in the art such as AMAZON WEB SERVICES (AWS), MICROSOFT AZURE, GOOGLE CLOUD, or the like.

In some embodiments, the orchestrator 112 may operate in cooperation with a KUBERNETES installation 124. KUBERNETES provides a deployment automation platform that can instantiate containers, instantiate applications in containers, monitor operation of containers, replace failed containers and application instances executed by the failed container, scale out or scale in a number of containers and a number of instances of a particular application according to loading.

In some embodiments, the orchestrator 112 creates containers and application instances according to a bundled application manifest by invoking the functionality of the KUBERNETES installation 124. The orchestrator 112 may extend the functionality of the KUBERNETES installation 124 in order to implement complex user requirements and to operate in conjunction with virtualized storage volumes implement using the storage manager 102.

Figure 2:
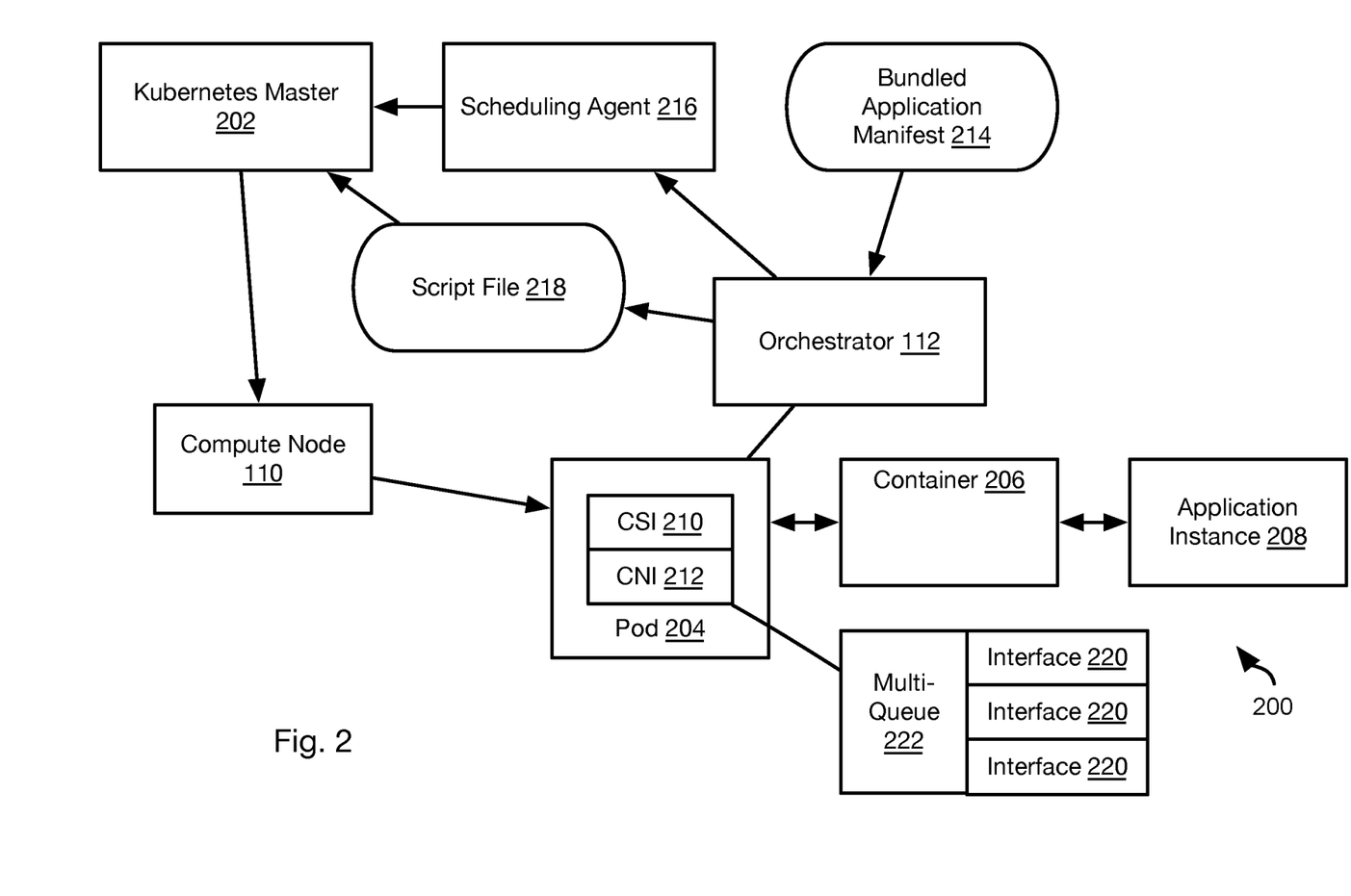
FIG. 2 is a schematic block diagram illustrating components for implementing multiple interfaces for a pod in accordance with an embodiment of the present invention.

Referring to FIG. 2, the illustrated architecture 200 illustrates components for extending the capacity of KUBERNETES to implement containers with multiple network interfaces of multiple different types.

The KUBERNETES installation 124 may include a KUBERNETES master 202, which is an application executing in the network environment 100 and which controls the instantiation of a pod 204 on a compute node 110. A pod 204 is an executable executing on the pod 204 that acts as an agent of the KUBERNETES master to instantiate and manage containers 206 executing on the node 110. Each container 206 executes an application instance 208. The pod 204 may also function to manage storage resources and network resources (e.g., internet protocol addresses) used by the containers 206 on the node 110. In particular, containers 206 may access storage and network communication by way of the pod 204.

User customization of a pod 204 may be provided by means of plugins called by the pod 204 to perform storage and networking management functions. One of these plugins may include a container storage interface (CSI) 210 that manages the mounting of storage to the pod and accessing of storage by the containers 206. Another plugin may include a container networking interface (CNI) 212 that manages networking functions. In some embodiments, one or both of the CSI 210 and CNI 212 are agents of the orchestrator 112 and coordinate with the orchestrator 112 when performing their functions. Accordingly, the orchestrator 112 may instruct the CSI 210 and/or CNI 212 to implement storage and networking as specified by a bundled application manifest 214.

In some embodiments, the KUBERNETES master 202 may invoke a scheduling agent 216 when invoking the creation of pods 204 and containers 206. In some embodiments, the scheduling agent 216 is also an agent of the orchestrator 112 and may coordinate with the orchestrator 112 to implement instantiation of containers 206 and application instances 208 according to the bunded application manifest 214.

The KUBERNETES master 202 may invoke the creation of pods 204, containers 206, and application instances 208 by interpreting a script file 218. For example, the script file 218 may be a YAML (YAML Ain't Markup Language) or a HELM chart according to the KUBERNETS protocol. The KUBERNETES master 202 may also implement individual operators input to the KUBERNETES master 202 by a user, the orchestrator 112, or other entity.

Figure 3A:
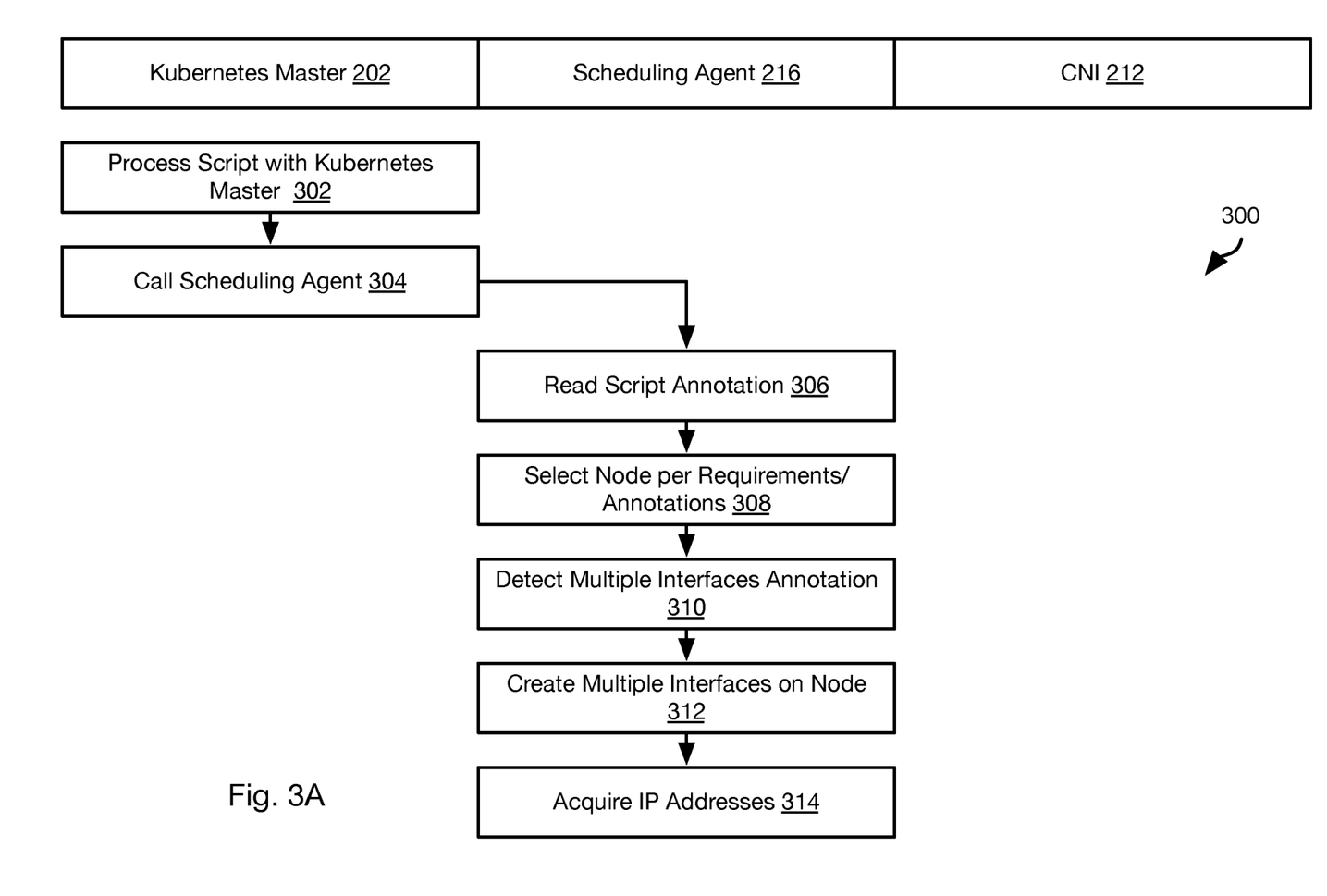
FIGS. 3A and 3B are process flow diagrams of a method for implementing multiple interfaces for a pod in accordance with an embodiment of the present invention.
Figure 3B:
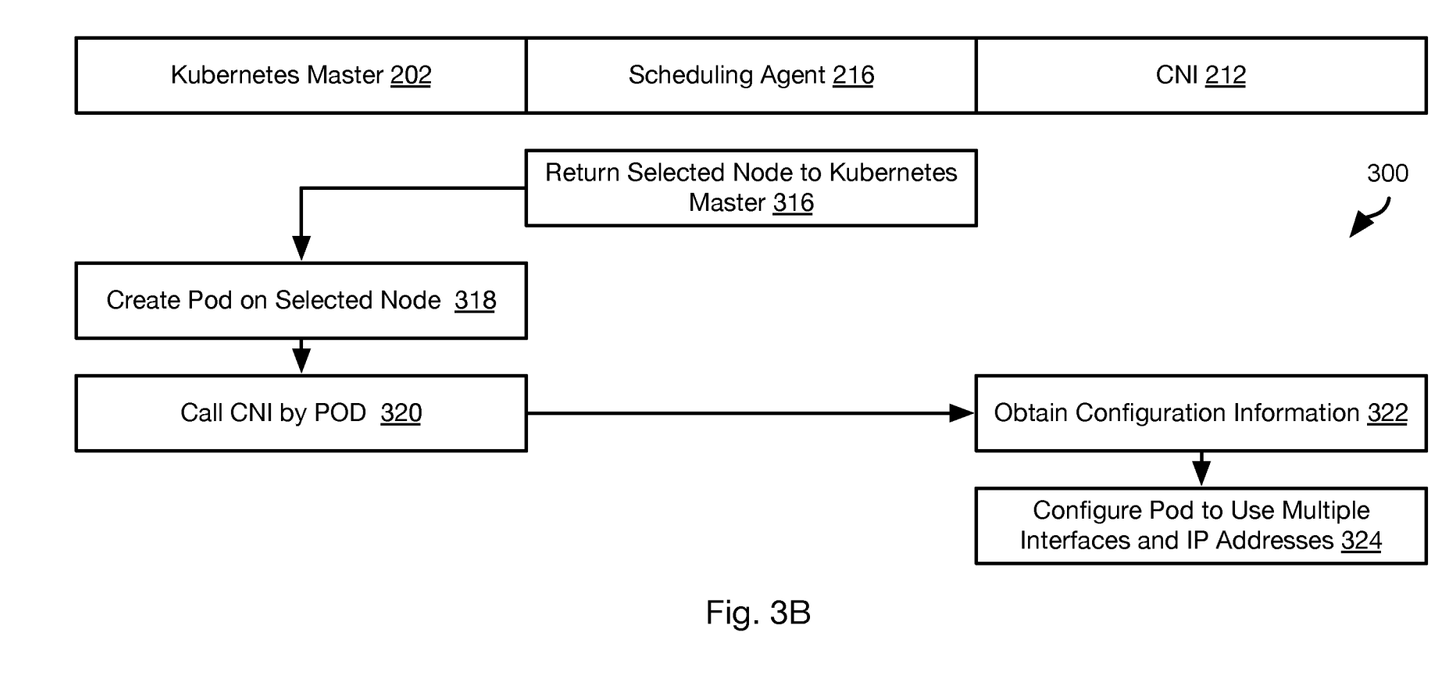

Referring to FIGS. 3A and 3B, while still referring to FIG. 2, the method 300 may be used to implement multiple network interfaces 220 for a same pod 204. The multiple interfaces 220 may be implemented with respect to a multiqueue networking plugin 222, such as MULTUS from Intel. Each interface 220 may have its own IP address and may be implemented using a network interface executable that is different form the network interface executable of another interface 220 of the same pod 204. Examples of network interface executables may include FLANNEL, CALICO, CANAL, WEAVE, CILIUM, KUBE-ROUTER, OVS, and SRIOV.

The method 300 may include processing 302 a script 218 by the KUBERNETES master 202. As part of processing the script 218, the KUBERNETES master 202 may be programmed to make 304 a function call to the scheduling agent 216. For example, each time the KUBERNETES master 202 encounters a command to create a pod 204 or a container 206 for a pod, the master 202 may be programmed to call 304 the scheduling agent 216 to obtain parameters relating to the creation of the pod 204 or container 206.

The method 300 may include the scheduling agent 216 reading the script and identifying annotations in the script. As noted above, the scheduling agent 216 may be an agent of the orchestrator 112. Accordingly, actions ascribed herein to the scheduling agent 216 may also be performed by the orchestrator 112. For example, the scheduling agent 216 may pass parameters from the call to the scheduling agent 216 to the orchestrator 112, e.g. an identifier of the pod and/or container to be created, the script 218 being processed, or other information.

The method 300 may include selecting 308 a compute node 110 for the pod 204 and/or container 206 specified in the call. The selection of step 308 may include selecting the node 110 according to constraints that are specified in one or both of (a) the annotations read at step 306 and (b) a bundled application manifest 214.

Examples of constraints may include a constraint that the pod 204 and/or container 206 have a specified degree of affinity with respect to another pod 204 and/or container 206. As used herein a "degree of affinity" may require instantiation on a common node 110, a common server rack, a common data center, or some other maximum permissible distance, network latency, or other parameter describing proximity. The constraint may be with respect to a storage volume: the pod 204 and/or container 206 may have a required degree of affinity to a storage volume.

Another example constraint may be a "degree of anti-affinity" with respect to another pod 204, container 206, or storage volume. As used herein "degree of anti-affinity" may be a prohibition of colocation on a common node, a common server rack, a common data center, or within some other minimum permissible distance, network latency, or other parameter describing proximity.

Another example constraint may be based on NUMA (non-uniform memory access) awareness. In some applications, a server may have more than one system bus and multiple processors (e.g., central processing units (CPU)) that may be on a common motherboard. Each of these processors may have its own memory (e.g., random access memory (RAM)) but also, at times, access the memory of another CPU, e.g., a remote memory. Accordingly, the access time of memory access requests will be non-uniform. A NUMA-aware constraint may require that two containers 206 be on a common node, or even have a specified degree of proximity on the common node, in order to reduce non-uniformity and latency of memory access requests to remote memory by each container.

Selecting 308 the node 110 for a pod 204 and/or container 206 may be performed in parallel with the selection of the nodes 110 for other pods 204 and/or containers 206 and storage volumes. This may be referred to as "planning" in which nodes 110 are assigned to multiple pods 204, containers 206, and storage volumes in such a way that constraints of each pod 204, container 206, and storage volume with respect to other pods 204, containers 206 and/or storage volumes are met.

In some embodiments, planning has already been performed prior to execution of the method 300 such that selecting 308 includes retrieving an identifier of the node 110 for a pod 204 and/or container 206 from the previously-generated plan.

The method 300 may further include detecting 310 a requirement for multiple network interfaces for the pod 204 and/or container 206. The requirement may specify some or all of a number of the multiple interfaces, IP addresses for the multiple interfaces, and a type of plugin to use for each interface (FLANNEL, CALICO, CANAL, WEAVE, CILIUM, KUBE-ROUTER, OVS, SRIOV, etc.). For example, certain types of computing activities may be more suited for a particular type of plugin and a single pod 204 and/or container may be performing multiple types of computing activities such that a developer prefers that multiple different types of interfaces be used, each with its own IP address.

The requirement for multiple interfaces may be included in annotations of the script processed at step 320. The requirement for multiple interfaces may also be included in a separate bundled application manifest 214. Accordingly, the scheduling agent may access the manifest 214 to obtain the requirement for multiple interfaces for a particular pod identifier or container identifier referenced in the manifest 214 in response to a call from the KUBERNETES MASTER 202 referencing that identifier.

The scheduling agent 216 may then create 312 the multiple interfaces according to the requirement identified at step 310. This may include creating 312 interface objects implementing the specified interface type on the node selected at step 308. The objects may each be instances of an interface type as specified in the requirement.

The creating 312 of interface objects may include configuring and combining multiple interface objects to implement a desired functionality. For example, the manifest 214 may instruct the scheduling agent 216 to:
define multiple network gateways.
configure chaining of multiple plugins.
creating a bonded interface.
configure source-based routing
configure one network plugin as a slave of a master network plugin.
configure a virtual interfaces as executing in kernel space or user space.
associate virtual functions to ports of a virtual interface.

The nodes selected by the scheduling agent 2126 for implementing a network interface may be selected to implement NUMA awareness (e.g., required degree of proximity or separation relative to other components created according to the manifest 214 to avoid a single point of failure).:

The method 300 may include acquiring 314 an IP address for each interface object as specified in the requirement, assigning the IP address to the node selected at step 308 and assigning each IP address to one of the interface objects.

The method 300 may continue as shown in FIG. 3B. The scheduling agent 216 may return 316 the selected node to the KUBERNETES master, e.g., an identifier (IP address, media access control (MAC) of the selected node, or some other identifier of the selected node.

The KUBERNETES master 202 may then invoke creation 318 of the pod and/or container on the selected node. Upon instantiation of the pod or a container in a pod, the pod may call 320 the CNI 212 that it is programmed with. As noted above, the CNI 212 may be an agent of the orchestrator 112. Actions ascribed herein to the CNI 212 may be performed by the CNI 212 or performed by the orchestrator 112 in response to a request or notification from the CNI 212.

The CNI 212 may obtain 322 network configuration information, such as from the orchestrator 112 or a database hosted or generated by the orchestrator 112. For example, references to the interface objects created at step 310 may be added to the database and associated with an identifier of the pod 204 instantiated at step 318 or for which a container was instantiated at step 318. The request may include an identifier of the pod 204 that invoked the CNI 212 to make the request. Accordingly, the CNI 212 or orchestrator 112 may request the references to the interface objects at step 322.

The CNI 212 may then configure 324 the pod 204 to use the multiple interfaces defined by the interface objects and the IP addresses associated with the multiple interfaces. This may include configuring a particular container 206 managed by the pod 204 to use a particular interface object for network communication. Thereafter, the CNI 212 may manage network communication by the containers 206 of a POD. Traffic from containers may be routed with a source address selected from the IP addresses associated with the multiple interfaces and processed using the interface object associated with that source address. Accordingly, a developer may configure a container 206 managed by a pod 204 to access any of the multiple interfaces suited for the computing activity being performed by the container 206.

Figure 4:
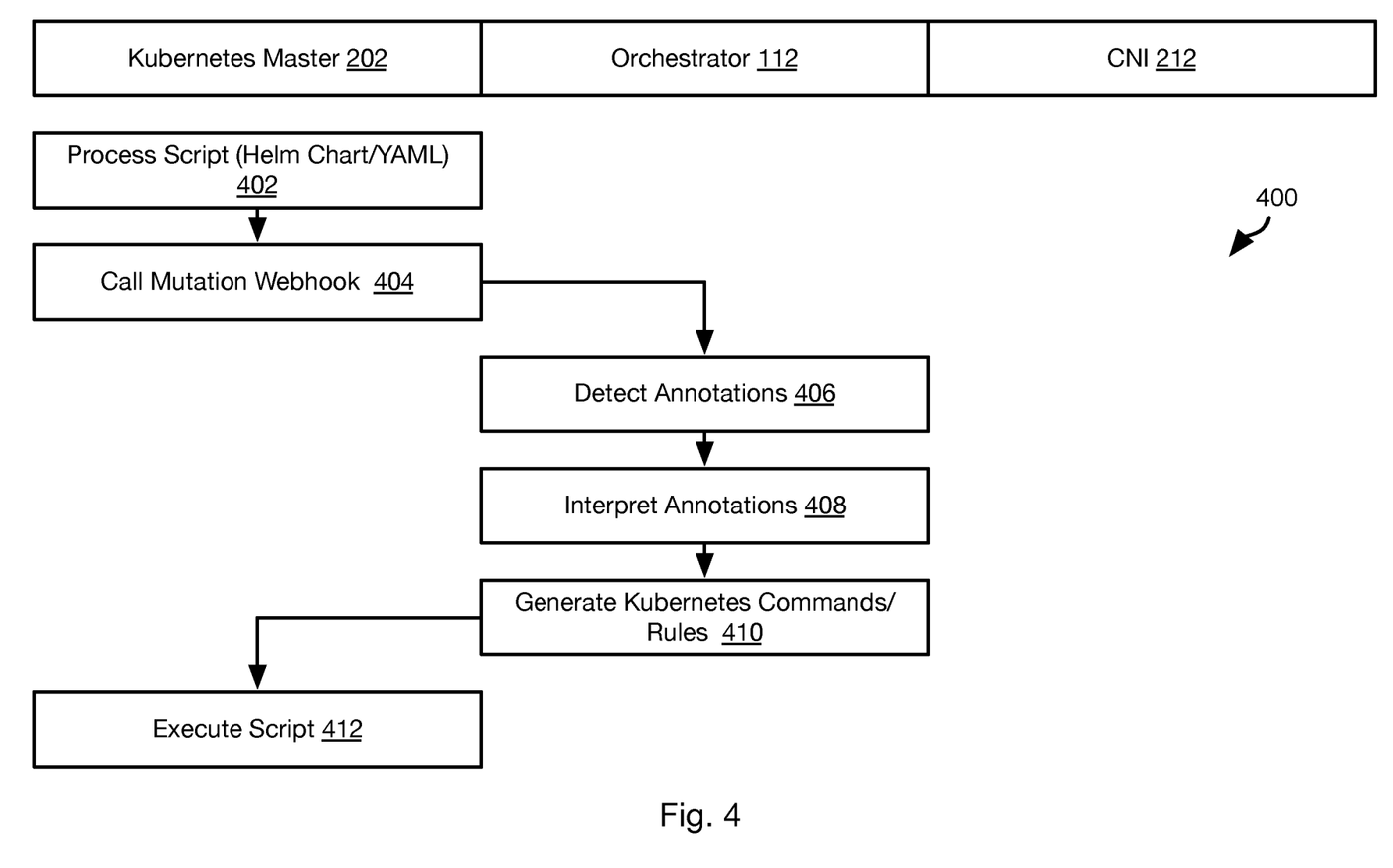
FIG. 4 is a process flow diagram of a method for generating augmented script files for implementing constraints in accordance with an embodiment of the present invention.

FIG. 4 illustrates a method 400 providing an alternative approach for implementing affinity and anti-affinity constraints for pods 204 and containers 206 instantiated by the KUBERNETES master 202.

The method 400 may include processing 402 a script 218, such as a YAML script or a HELM chart. The script 218 may include annotations specifying affinity and/or anti-affinity constraints. The annotations may be in the form of plain human language statements that are flagged or marked as annotations as opposed to machine interpretable instructions for the KUBERNETES master 202. For example, the annotations may be include plain human language statements such as "container A must be on the same node as container B," "container A must not be on the same node as container B," "container A must be on the same server rack as container B," "container A must not be on the same server rack as container B." Similar statements may be made with respect to same data center affinity or anti-affinity, same city affinity or anti-affinity, or any other proximity requirement or prohibition.

The method 400 may further include the Kubernetes Master 202 calling a "mutation webhook." The mutation webhook may be an executable specified in the script 218 or in a configuration of the KUBERNETES master 202 that specifies an executable that is executed before the operations specified in the script 218 are executed by the KUBERNETES master 202. In particular, the mutation webhook may be an executable that is provided the script file 218 and preprocesses the script file 218. In the method 400, the mutation webhook may reference the orchestrator 112. Alternatively, the functions ascribed to the orchestrator 112 in the description of the method 400 may be performed by another executable that is an agent of the orchestrator 112 or another executable that functions as a preprocessor.

The orchestrator 112 detects 406 the annotations in the script 218. For example, annotations may be formatted according to an annotation format of KUBERNETES such that the orchestrator 112 can identify them:
"metadata": {
  "annotations": {
    "[PLAIN HUMAN LANGUAGE STATEMENT]"
  }
}.

The orchestrator 112 may then interpret 408 the annotations. Interpreting 408 the annotations may include using a natural language processing (NLP) algorithm to determine identifiers of the entities (containers, storage volumes, pods) referenced in the plain human language statement, a proximity (same node, same rack, same data center, same city, etc.), and a type (affinity or anti-affinity). The orchestrator 112 may then generate 410 a set of KUBERNETES instructions that will invoke creation of the referenced entities with the required affinity or anti-affinity. For example, these instructions may include logic that records a node selected for a first entity in the annotation by KUBERNETES and then use a nodeSelector function of KUBERNETES to select a node for the second entity that meets the affinity or anti-affinity constraint. The generated KUBERNETES instructions may be inserted into the script 218 in place of the annotation that the operations replaced. In particular, each annotation in the script 218 may be replaced with a set of KUBERNETES instructions that are derived for that annotation according to steps 408 and 410.

The KUBERNETES master 202 may then execute 412 the script 218 as modified according to step 410. This may include instantiating pods and containers satisfying the affinity and anti-affinity constraints. Executing 412 the script 218 may further include invoking the orchestrator 112 to create storage volumes for pods and containers according to the bundled application manifest 214 with the pods and containers also satisfying any affinity and anti-affinity constraints specified in the annotations.

Figure 5:
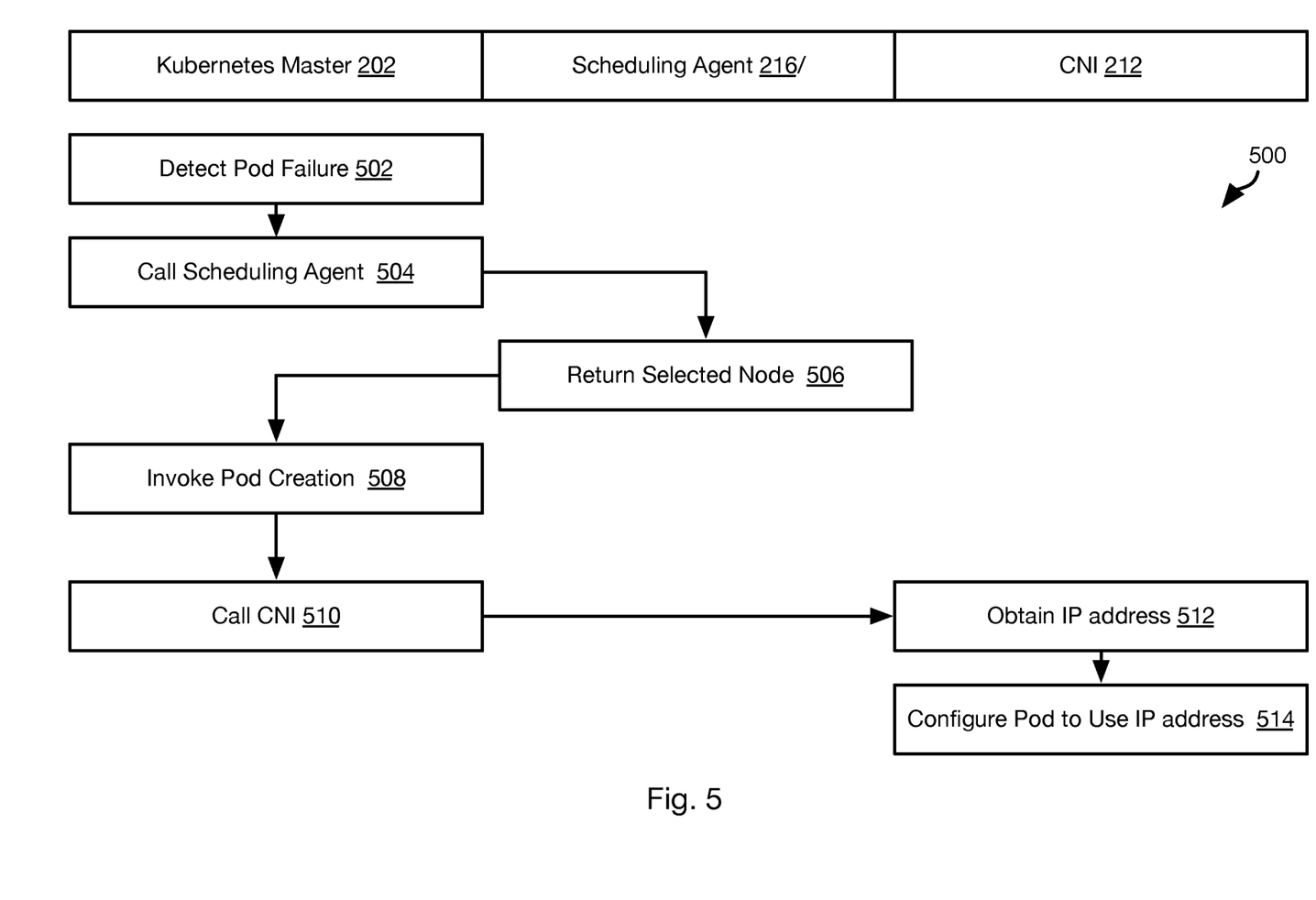
FIG. 5 is a process flow diagram of a method for restoring the IP address of a replacement pod in accordance with an embodiment of the present invention.

FIG. 5 illustrates a method 500 for setting the IP address of a replacement pod 204 to be the same as the failed pod 204 the replacement pod 204 is replacing. KUBERNETES provides a mechanism for monitoring the performance of pods 204 and automatically replacing failed pods 204. However, KUBERNETES does not provide a mechanism to maintain the IP address of the replacement pod 204 to be the same as the failed pod 204.

The method 500 may include the KUBERNETES master 202 detecting 502 failure of a pod 204 having a pod identifier. In response, the KUBERNETES master 202 may call 504 the scheduling agent 216 and pass it the pod identifier. In response, the scheduling agent 216 may retrieve a node assigned to that pod identifier from a database. For example, each the orchestrator 112 may create entries in the database that include, for each pod identifier, an identifier of the node 110 selected for that pod identifier when the pod 204 was instantiated. Accordingly, for the pod identifier in the call of step 504, the scheduling agent 216 may return to the KUBERNETES master 202 an identifier of the node associated with that pod identifier in the database.

The KUBERNETES master 202 may then invoke 508 creation of the replacement pod 204 on the selected node 110 referenced by the node identifier returned at step 506. Upon creation on the selected pod 204, the pod 204 may call 510 a CNI 212 that the pod 204 was previously programmed to call. As noted above, the CNI 212 may be an agent of the orchestrator 112 and may respond to the call by obtaining 512 an IP address from the orchestrator 112 or directly from the database. For example, the database may store each IP address assigned to a pod 204 in association with the identifier of the pod 204 to which the IP address was assigned. This may include IP addresses assigned according to the method 300. The CNI 212 may then configure 514 the replacement pod 204 to use the IP address obtained at step 512.

Figure 6:
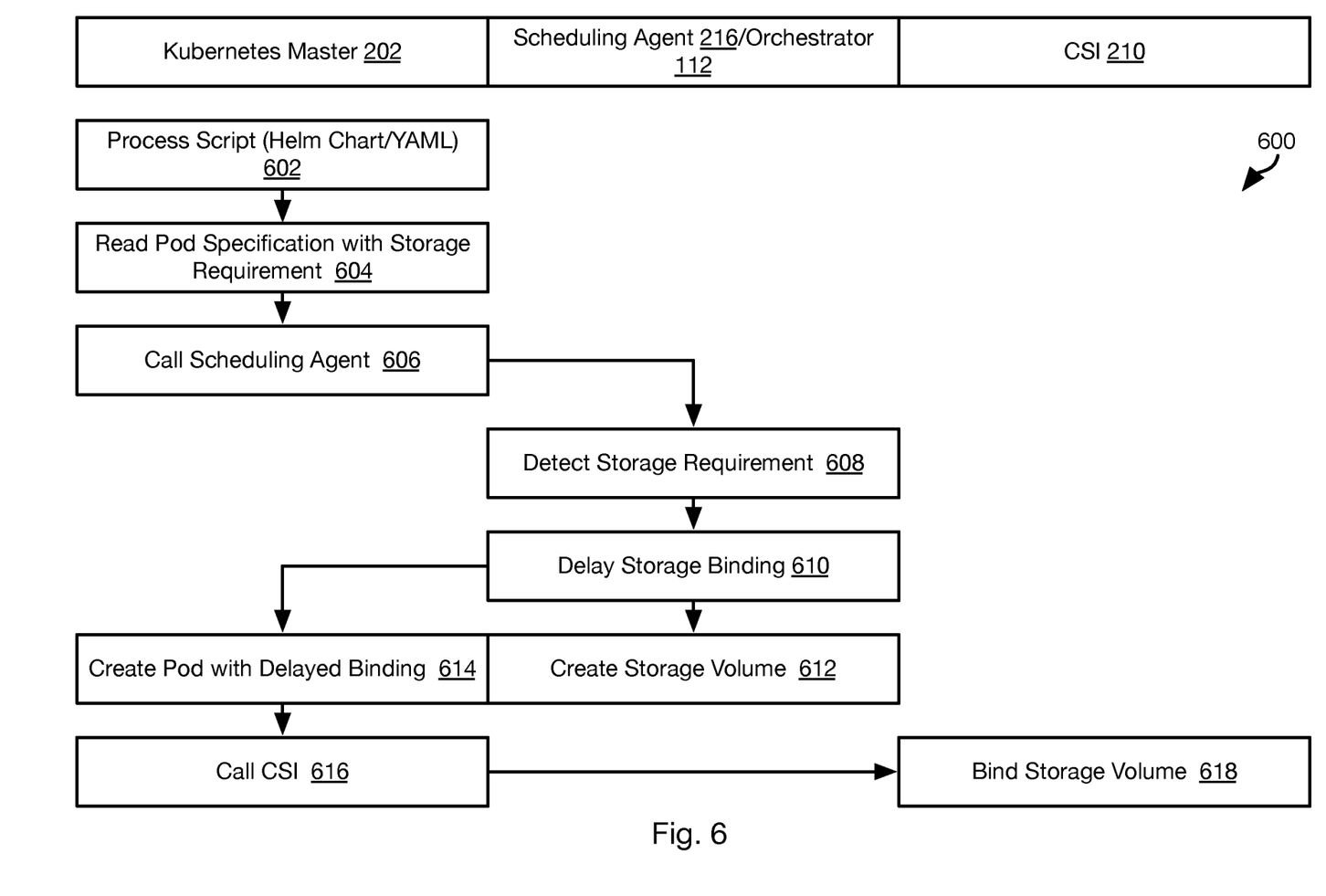
FIG. 6 is a process flow diagram of a method for binding a storage volume to a container in accordance with an embodiment of the present invention.

Referring to FIG. 6, the illustrated method 600 may be used to enable KUBERNETES to operate with virtualized storage managed by the storage manager 102.

The method 600 may include processing 602 a script 218 by the KUBERNETES master 202, which includes reading 604 an instruction to create a pod 204 and mount a storage volume to the pod 204. In response to reading the instruction, the KUBERNERTES master 202 may call 606 the scheduling agent 216, the call including a pod identifier and possibly an identifier of the storage volume to be bound to the pod 204. As noted above, the scheduling agent 216 may be an agent of the orchestrator 112. Accordingly, step of the method 600 ascribed to the scheduling agent 216 may also be performed by the orchestrator 112 in response to a notification from the scheduling agent 216.

In response to the call, the scheduling agent 216 may detect 608 a storage requirement for the pod identifier. This may include detecting a reference to the storage volume in the call, e.g. the specifications of the storage volume (e.g., size) may be included in the script 218 and passed to the scheduling agent with the call at step 606. The specification of the storage volume may also be included in the bundled application manifest 214. For example, a storage volume specification in the bundled application manifest 214 may be any of (a) associated with the pod identifier in the manifest 214, (b) associated with a container identifier specified in the bundled application manifest 214 that is to be managed by the pod 204 referenced by the pod identifier, or (c) associated with an application instance specified in the bundled application manifest 214 to be executed within a container managed by the pod 204 referenced by the pod identifier.

In response to detecting the storage requirement, the scheduling agent 216 may instruct 610 the KUBERNETES master 202 to delay binding of the storage volume to the pod referenced by the pod identifier ("lazy binding"). Accordingly, the Kubernetes master 202 may create 614 a pod 204 according to the pod specification without binding a storage volume to it. The scheduling agent 216 may further instruct the storage manager 102 to create 612 a storage volume according to a specification of the storage volume. The storage volume may be mounted to the node on which the pod is to be created. For example, creating 614 the pod 204 may include obtaining an identifier of a node 110 on which the pod 204 is to be instantiated from the scheduling agent 216 as for other embodiments disclosed herein. The storage volume may then be mounted to that node. The storage volume may be implemented on a storage device 108 local to the node 110 hosting the pod 204 created at step 614 (e.g., a hybrid node that is both a compute and storage node) or may be implemented on a storage device 108 of another node 106, 110.

Following creation at step 614, the pod 204 may call 616 a CSI 210 that it is configured to call upon instantiation, the CSI 210 being an agent of the orchestrator 112 as described above. As for other embodiments disclosed herein, actions ascribed to the CSI 210 may be performed by the orchestrator 112 in response to a notification from the CSI 210.

In response to the call from step 616, the CSI 210 may bind 618 the storage volume created at step 612 to the pod created at step 614. As noted above, the storage volume may previously have been mounted to the node on which the pod 204 was created such that the locally mounted storage volume may then be bound by the CSI 210 to the pod 204 created at step 614.

Figure 7:
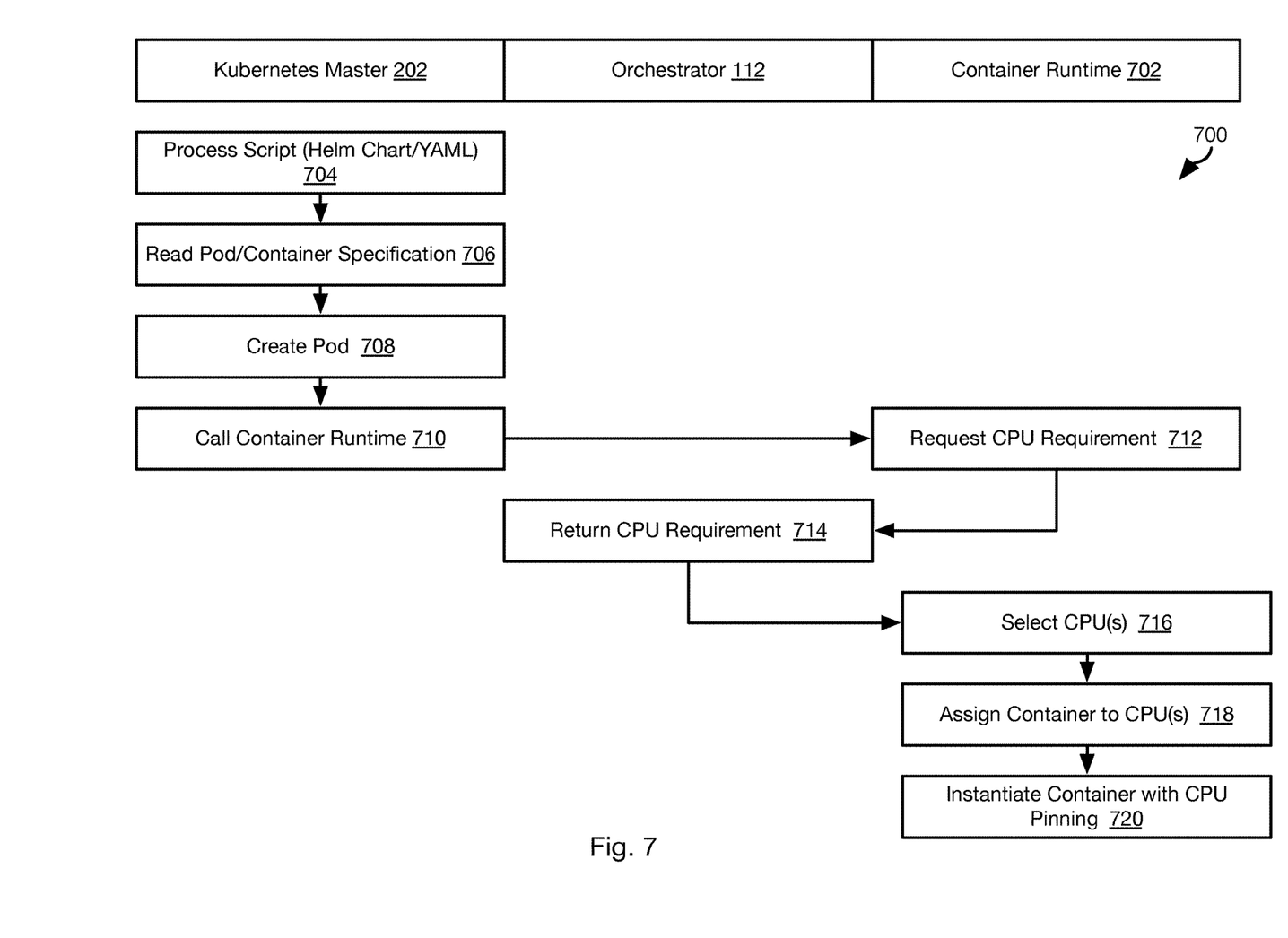
FIG. 7 is a process flow diagram of a method for implementing CPU exclusivity in accordance with an embodiment of the present invention.

FIG. 7 illustrates a method 700 for controlling assignment of containers 206 to CPUs of a node 110. The method 700 may be used to ensure the performance and stability of containers executing critical application instances 208. The method 700 may also be used for NUMA awareness, e.g., making sure different application instances 208 are executed by the same CPU or a same pool of CPUs. In the illustrated implementation, a pod 204 may be configured to call a container runtime 702 in order to instantiate the containers specified for the pod 204 in the bundled application manifest 214. In the illustrated embodiment, the container runtime 702 is an agent of the orchestrator 112 and may coordinate with the orchestrator 112 as described below.

The method 700 may include the KUBERNETES master 202 processing 704 a script 218 and reading 706 specifications for a pod 204 and one or more containers 206 to be instantiated and managed by the pod. In response to reading 706 the specifications, the KUBERNETES master 202 may invoke creation 708 of a pod 204. The KUBERNETES master 202 may further instruct the pod 204 created at step 708 to create one or more containers 206 (the number being specified in the specifications) and configure the pod 204 to use the container runtime 702. Accordingly, upon creation, the pod 204 may call 710 the container runtime 702 and instruct the container runtime 702 to create one or more containers 206 as instructed by the KUBERNETES master 202.

The container runtime 702 receives the call and, in response, requests 712 from the orchestrator 112 a CPU requirement for the one or more containers to be instantiated. For example, the specifications for the pod 204 and one or more containers may include container identifiers. The container identifiers may be passed to the container runtime 702, which passes the container identifiers to the orchestrator 112. The orchestrator 112 may look up CPU requirements for the one or more container identifiers in the bundle application manifest 214 and return 714 the CPU requirements to the container runtime 702. Examples of CPU requirements may include any of the following: (a) container A must be the only container executed by the CPU to which it is assigned, (b) container A may share a CPU with no more than N other containers, where N is an integer greater than or equal to 1, (c) containers A, B, and C (or any number of containers) must be the only containers assigned to at least N CPUs, where N is an integer greater than or equal to 1.

The container runtime 702 receives the CPU requirement and selects 716 one or more CPUs for each container identifier according to the requirement. For example, if a single exclusive CPU is required, a previously unassigned CPU may be selected. Where a first CPU is being used by a previously-instantiated container that does not require exclusivity, the previously-instantiated container may be assigned to a second CPU that is being used by another previously-instantiated container. The first CPU may then be assigned to the container requiring an exclusive CPU. In a like manner, a group of CPUs may be assigned to a group of containers requiring exclusive CPUs. Where a container does not require exclusivity, a CPU that is assigned to a previously-instantiated container may be assigned to the container. Where a container requires no more than a maximum number of containers be assigned to the same CPU as the container, a CPU may be selected such that the number of previously-instantiated containers assigned to that CPU is less than the maximum number of containers.

The container runtime 702 assigns 718 the one or more containers to the CPUs selected at step 716 for the one or more containers. The container runtime 702 may then invoke instantiation of the one or more containers pinned to the CPUs to which they are assigned. This may include calling a container runtime such as DOCKER, LINUX containers (LXC), or other container. For example, the container runtime 702 may call a docker daemon with instructions to instantiate 720 the one or more containers pinned to the CPUs selected for them at step 716.

Figure 8:
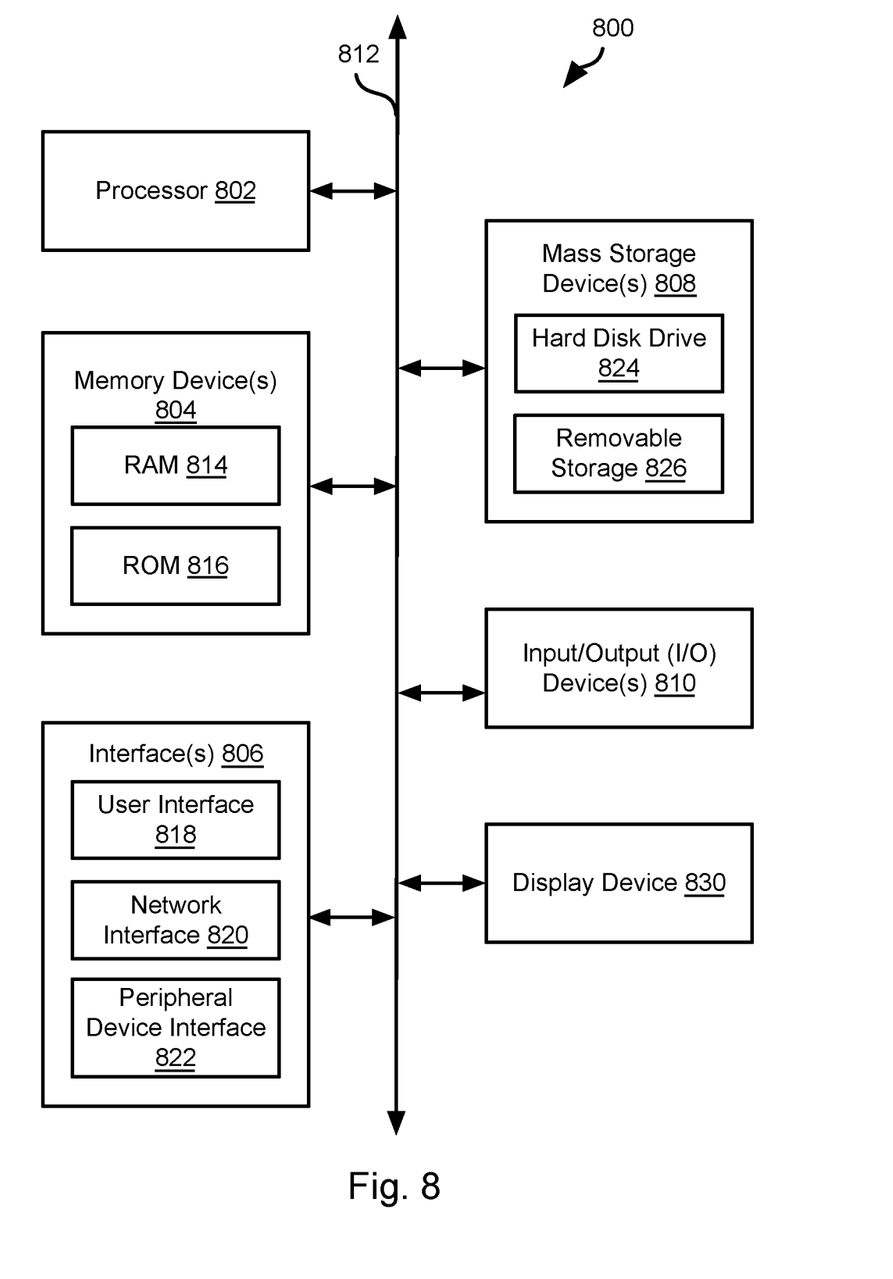
FIG. 8 is a schematic block diagram of an example computing device suitable for implementing methods in accordance with embodiments of the invention.

FIG. 8 is a block diagram illustrating an example computing device 800. Computing device 800 may be used to perform various procedures, such as those discussed herein. The storage manager 102, storage nodes 106, compute nodes 110, and hybrid nodes, may have some or all of the attributes of the computing device 800.

Computing device 800 includes one or more processor(s) 802, one or more memory device(s) 804, one or more interface(s) 806, one or more mass storage device(s) 808, one or more Input/output (I/O) device(s) 810, and a display device 830 all of which are coupled to a bus 812. Processor(s) 802 include one or more processors or controllers that execute instructions stored in memory device(s) 804 and/or mass storage device(s) 808. Processor(s) 802 may also include various types of computer-readable media, such as cache memory.

Memory device(s) 804 include various computer-readable media, such as volatile memory (e.g., random access memory (RAM) 814) and/or nonvolatile memory (e.g., read-only memory (ROM) 816). Memory device(s) 804 may also include rewritable ROM, such as Flash memory.

Mass storage device(s) 808 include various computer readable media, such as magnetic tapes, magnetic disks, optical disks, solid-state memory (e.g., Flash memory), and so forth. As shown in FIG. 8, a particular mass storage device is a hard disk drive 824. Various drives may also be included in mass storage device(s) 808 to enable reading from and/or writing to the various computer readable media. Mass storage device(s) 808 include removable media 826 and/or non-removable media.

I/O device(s) 810 include various devices that allow data and/or other information to be input to or retrieved from computing device 800. Example I/O device(s) 810 include cursor control devices, keyboards, keypads, microphones, monitors or other display devices, speakers, printers, network interface cards, modems, lenses, CCDs or other image capture devices, and the like.

Display device 830 includes any type of device capable of displaying information to one or more users of computing device 800. Examples of display device 830 include a monitor, display terminal, video projection device, and the like.

Interface(s) 806 include various interfaces that allow computing device 800 to interact with other systems, devices, or computing environments. Example interface(s) 806 include any number of different network interfaces 820, such as interfaces to local area networks (LANs), wide area networks (WANs), wireless networks, and the Internet. Other interface(s) include user interface 818 and peripheral device interface 822. The interface(s) 806 may also include one or more peripheral interfaces such as interfaces for printers, pointing devices (mice, track pad, etc.), keyboards, and the like.

Bus 812 allows processor(s) 802, memory device(s) 804, interface(s) 806, mass storage device(s) 808, I/O device(s) 810, and display device 830 to communicate with one another, as well as other devices or components coupled to bus 812. Bus 812 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 800, and are executed by processor(s) 802. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A method comprising:
generating, by a first orchestration platform executing in a network environment including one or more computer systems connected by a network, a call to a scheduling agent executing in the network environment, the call including a reference to a pod;
in response to receiving the call, performing, by the scheduling agent, prior to creating the pod:
creating a plurality of interface objects on a computing node of the network environment;
assigning a plurality of internet protocol (IP) addresses to the plurality of interface objects; and
returning, an identifier of the computing node to the first orchestration platform,
creating, by the first orchestration platform, the pod on the computing node;
calling, by the pod, a networking plugin of the pod; and
configuring, by the networking plugin, the pod to use the plurality of interface objects.

2. The method of claim 1, further comprising:
processing, using the first orchestration platform, a script, the script including a specification for the pod.

3. The method of claim 1, wherein the pod is an object configured to control operation of one or more containers executing on the computing node.

4. The method of claim 1, further comprising:
executing, in the network environment, a second orchestration platform, the scheduling agent and the networking plugin being agents of the second orchestration platform and configured to coordinate with the second orchestration platform.

5. The method of claim 4, further comprising, obtaining by the scheduling agent a specification of the plurality of interface objects and the plurality of IP addresses from the second orchestration platform.

6. The method of claim 5, further comprising obtaining, by the networking plugin, references to the plurality of interface objects from the second orchestration platform.

7. The method of claim 5, further comprising obtaining, by the second orchestration platform, the plurality of IP addresses according to a bundled application manifest and returning the plurality of IP addresses to the scheduling agent.

8. The method of claim 1, wherein the first orchestration platform is a KUBERNETES installation.

9. The method of claim 1, wherein each of the plurality of interface objects is a different type of interface object.

10. The method of claim 9, wherein the plurality of interface objects include objects of at least two types of a plurality of types, the plurality of types including CALICO, FLANNEL, CANAL, WEAVE, CILIUM, and KUBE-ROUTER.

11. A system comprising:
a network environment including one or more computer systems connected by a network, each computer system of the one or more computer systems including one or more processing devices and one or more memory devices connected to the one or more processing devices;
wherein the one or more computer systems are programmed to execute a first orchestration platform and a scheduling agent;
wherein the first orchestration platform is programmed to generate a call to the scheduling agent, the call including a reference to a pod;
wherein the scheduling agent is programmed to receive the call and, in response to the call and prior to creating the pod:
create a plurality of interface objects on a computing node of the network environment;
assign a plurality of internet protocol (IP) addresses to the plurality of interface objects; and
return an identifier of the computing node to the first orchestration platform;
wherein the first orchestration platform is further programmed to create the pod on the computing node; and
wherein the pod includes a networking plugin configured to configure the pod to use the plurality of interface objects.

12. The system of claim 11, wherein the first orchestration platform is further programmed to:
process a script, the script including a specification for the pod.

13. The system of claim 11, wherein the pod is an object configured to control operation of one or more containers executing on the computing node.

14. The system of claim 11, wherein the one or more computer systems are further programmed to execute a second orchestration platform, the scheduling agent and the networking plugin being agents of the second orchestration platform and configured to coordinate with the second orchestration platform.

15. The system of claim 14, wherein the scheduling agent is programmed to obtain a specification of the plurality of interface objects and the plurality of IP addresses from the second orchestration platform.

16. The system of claim 15, wherein the networking plugin is programmed to obtain references to the plurality of interface objects from the second orchestration platform.

17. The system of claim 15, wherein the second orchestration platform is programed to obtain the plurality of IP addresses according to a bundled application manifest and return the plurality of IP addresses to the scheduling agent.

18. The system of claim 11, wherein the first orchestration platform is a KUBERNETES installation.

19. The system of claim 11, wherein each of the plurality of interface objects is a different type of interface object.

20. The system of claim 19, wherein the plurality of interface objects include objects of at least two types of a plurality of types, the plurality of types including CALICO, FLANNEL, CANAL, WEAVE, CILIUM, and KUBE-ROUTER.

* * * * *